United States Patent
Bedell, Jr. et al.

(10) Patent No.: US 7,255,272 B2
(45) Date of Patent: Aug. 14, 2007

(54) CARD READER/WRITER DEVICES AND METHODS

(75) Inventors: Edwin A. Bedell, Jr., Danville, PA (US); Larry W. Ditty, Sunbury, PA (US); Terry Schindler, Sunbury, PA (US); Walter C. Bonneau, Jr., Escondido, CA (US)

(73) Assignee: Brush Industries, Inc., Sunbury, PA (US)

( * ) Notice: Subject to any disclaimer, the term of this patent is extended or adjusted under 35 U.S.C. 154(b) by 387 days.

(21) Appl. No.: 10/860,616

(22) Filed: Jun. 3, 2004

(65) Prior Publication Data

US 2005/0006471 A1 Jan. 13, 2005

Related U.S. Application Data

(60) Provisional application No. 60/477,133, filed on Jun. 9, 2003.

(51) Int. Cl.
*G06K 7/00* (2006.01)
(52) U.S. Cl. ...................................... 235/440
(58) Field of Classification Search ................. 235/440
See application file for complete search history.

(56) References Cited

U.S. PATENT DOCUMENTS

| | | | |
|---|---|---|---|
| 5,206,495 A | | 4/1993 | Kreft |
| 5,640,002 A | * | 6/1997 | Ruppert et al. ........ 235/462.46 |
| 5,847,372 A | | 12/1998 | Kreft |
| 5,933,812 A | * | 8/1999 | Meyer et al. ................. 705/15 |
| 6,068,193 A | | 5/2000 | Kreft |
| 2002/0020903 A1 | | 2/2002 | Kreft et al. |
| 2002/0041466 A1 | | 4/2002 | Tobitsuka et al. |
| 2004/0173679 A1 | * | 9/2004 | Oki et al. ..................... 235/449 |

FOREIGN PATENT DOCUMENTS

EP 0 565 759 10/1993

* cited by examiner

*Primary Examiner*—Michael G. Lee
*Assistant Examiner*—Tae W. Kim
(74) *Attorney, Agent, or Firm*—Spilman Thomas & Battle PLLC

(57) ABSTRACT

Card reader/writer devices and methods for reading/writing both M-cards, PICCs, and/or S-cards, wherein such devices can comprise a magnetic head (which can have multiple tracks), an A/D converter, a gated buffer module associated with the A/D converter, an F2F decoder associated with the gated buffer module for enabling the integration of multiple discrete M-card reader formats with decoder functions, and an integral PICC data processor, which can perform the functions of a PCD, for reading/writing a PICC along with the M-card. An internal RF analog antenna circuit can be provided for receiving signals from the PICC, or an external PCD antenna can be connectable to the RF circuit. The F2F decoder can be integrated with the PICC data processor, and the A/D converter can process analog data from both the magnetic head and the RF antenna circuit. A contact module could also be provided to read/write an S-card.

40 Claims, 4 Drawing Sheets

CARD READER/WRITER DEVICES AND METHODS

CROSS REFERENCE TO RELATED APPLICATION

This patent application claims priority to U.S. Provisional Patent Application Ser. No. 60/477,133, Jun. 9, 2003.

BACKGROUND

The invention generally relates to card reading and/or writing devices and associated methods, including devices having one or more magnetic heads for reading and/or writing magnetic cards (M-cards) and devices for reading and/or writing smart cards (S-cards) or Proximity Integrated Circuit Cards (PICCs), which are a contactless type of S-card. More particularly, the invention relates to a pseudo intelligent magnetic head and proximity coupling devices for reading/writing both types of cards, and multiple track magnetic head devices for integrating multiple discrete magnetic strip card reader formats with decoder functions, in a single small footprint contained package.

Both PICCs and S-Cards have a chip, e.g., a tiny microprocessor or wired memory logic circuit, embedded in the card. The PICC has a small antenna which can be a made from copper conductive ink or aluminum, that is coiled inside the card, in addition to the embedded microprocessor chip, or memory logic circuit. The PICC can be read/written without making physical contact with a reader/writer, e.g., PCD, so long as the PCD similarly has components for receiving/transmitting the wireless (e.g., RF) signal from the PICC. All that is necessary is to pass the PICC within a certain distance of the PCD.

The S-card, on the other hand, must be brought into contact with a reader/writer, such as by being inserted into a contact module. The contact module makes contact with the chip in the S-card to transfer information is between the contact module and the S-card.

Dual track magnetic head devices, and in some cases tri-track heads, are known in the art. However, such magnetic head devices do not have the ability to selectively decode multiple analog tracks of magnetic information read from a M-card within a single small footprint contained package. Prior art magnetic head devices are also not known to have the capability to further integrate a PCD with antenna to enable a PICC or S-card to be read and written in conjunction with a M-card. Such prior art magnetic head devices also do not have the necessary interface and signaling activity necessary to manage both functions, thereby permitting both M-cards and PICCs, or S-cards, to be managed and processed enabling coexistence.

Conventional dual or tri-track magnetic head devices also struggle with the difficult task of matching a magnetic head selection and output stream with an associated F2F discrete decoder device or devices. In addition, it is not possible to auto configure the magnetic reader to accept multiple tracks with varying formats. Conventional magnetic heads with multiple tracks require both an equal number of associated F2F decoders and interface logic made up of multiple components, thus requiring large undesired footprints and increased power consumption.

SUMMARY

According to the invention, pseudo intelligent card reader/writer devices and associated methods are provided for reading/writing both M-cards, PICCs, and/or S-cards. Overall, an embodiment of the invention can comprise a multiple track magnetic head device having an analog to digital (A/D) converter, a gated buffer module associated with the A/D converter, a two-frequency coherent phase (F2F) decoder associated with the gated buffer module for enabling the integration of multiple discrete M-card reader formats with decoder functions, and an integral PICC data processor, which can perform the functions of a Proximity Coupling Device (PCD), providing the added capability of reading/writing a PICC in conjunction with the M-card, wherein all components can be contained within a single small footprint package. An internal RF antenna can also be provided for receiving signals from the PICC, or an external PCD antenna can be connectable to the RF antenna circuit. The F2F decoder can be integrated with the PICC data processor, and the A/D converter can process raw, analog, data from both the magnetic head and the internal RF analog antenna circuit. A serial interface controller for connecting with external equipment can also be provided as part of the device, as can a crypto/security unit for encrypting/decrypting output/input. A contact module could also be provided if desired to read/write a contact type S-card.

An embodiment of the invention, referred to hereinafter as a "Multi-Track Magnetic Head Device" (MTMD), can comprise a tri-track magnetic head with each track associated with the A/D converter, a gated buffer module, and a matched F2F decoder, enabling the selective decoding of any of the analog tracks of information, or combinations thereof, read from an M-card, the MTMD can further comprise a serial interface controller for connecting with external equipment, and the capability to receive control signals from an external PCD having a PCD antenna connected to the A/D converter or gated buffer module. The gated buffer module can detect both magnetic and PICC activity, and can control priority as between magnetic data streams and PICC activity if both are presented simultaneously.

A more complex embodiment of the invention, referred to as an "Integrated M-Card/PICC Digital Signal Processor" (IMPD), can comprise integrating the aforesaid PCD functionality with the combined A/D converter and matched F2F decoder. The PICC Data processor can be configured to manage the required PICC bit data processing and signaling functions of a PCD. The F2F decoder is preferably be integrated with the PICC Data processor, but could be separate module. The integral RF analog antenna circuit receives analog PICC signals from the PICC, and feeds the signals to the combined A/D converter, which processes the analog signals from the RF analog antenna circuit as well as the analog data from the magnetic tracks. M-card and PICC activity is detected and controlled by the gated buffer, which receives input from the A/D converter. When dual activity is detected, the gated buffer module can resolve contention by preempting either the M-card activity or the PICC activity, which could be based upon which process started first. Since all of the logic can be integrated into the single small footprint device, the possibility of two electronic media types attempting to process at the same time, thereby creating contention, is minimized. This can be accomplished by designing the gated buffer module in a manner such that a new processing task will not be enabled until a previously initiated task is completed. However, there is still the possibility of magnetic and PICC activity contending for processing by the Data Processor. In the event that a PICC requires immediate processing, the gated buffer module may preempt the M-Card activity. In addition, an M-Card active signal is generated by the gated buffer module which provides an external control status that can signify an active M-Card, or, if the M-Card is not active, that a PICC is active, or that there is no activity.

Other details, objects, and advantages of the invention will become apparent from the following detailed description and the accompanying drawings figures of certain embodiments thereof.

BRIEF DESCRIPTION OF THE DRAWING FIGURES

DETAILED DESCRIPTION OF CERTAIN EMBODIMENTS

Although certain embodiments of the invention are shown and described in detail below, it is to be understood that various changes and modifications to the described embodiments may be made without departing from the scope of the appended claims. The scope of the invention should thus be in no way be limited in respect to the number of constituting components, the materials thereof, the shapes thereof, the relative arrangement thereof, etc., which are disclosed hereinafter merely as examples of certain embodiments of the invention.

Figure 1:
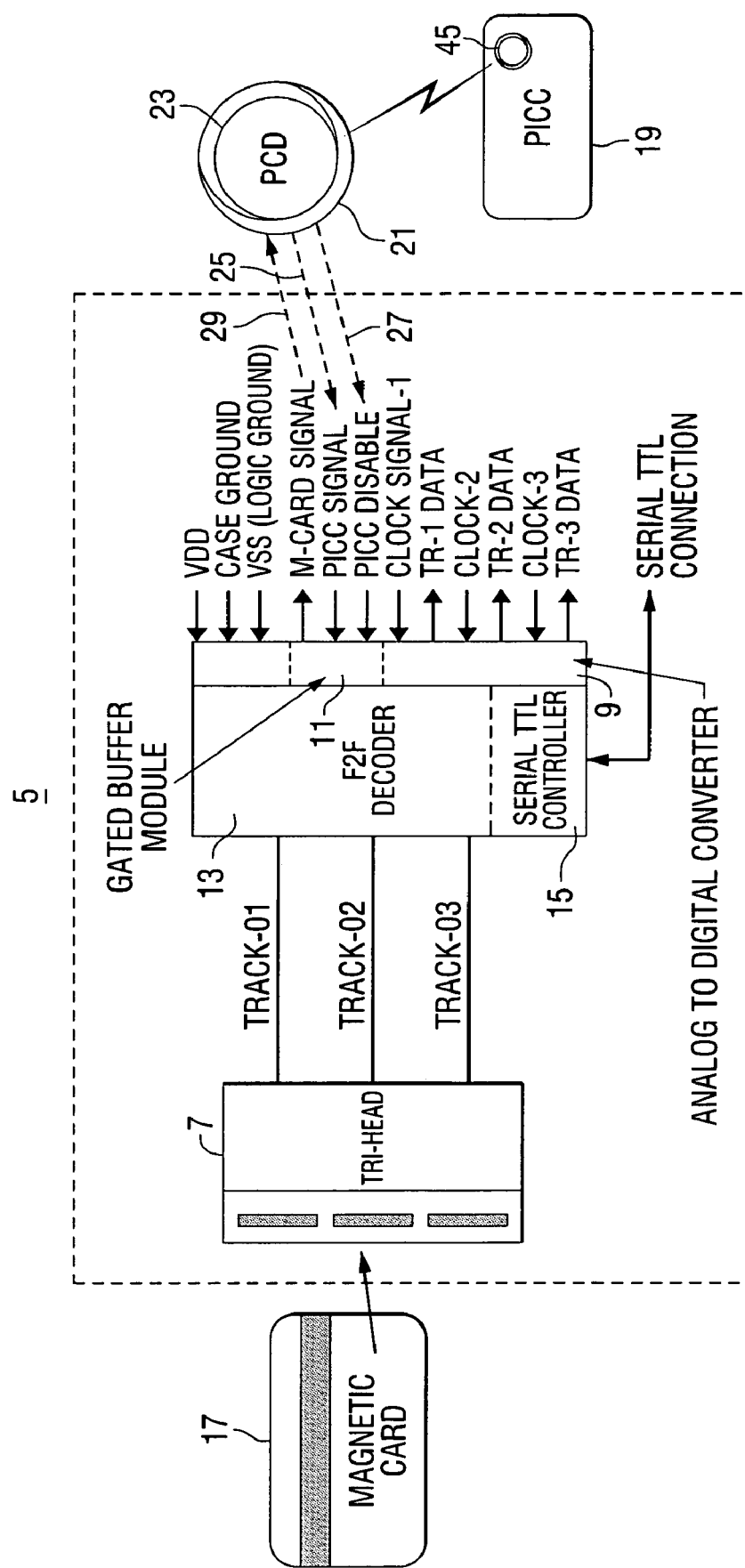
FIG. 1 illustrates an embodiment of an MTMD configuration according to the invention.

Referring to FIG. 1, an embodiment of an MTMD configuration 5 according to the invention is shown, comprising a magnetic head 7 (in this example having three discreet tracks-01, 02, 03), an A/D converter 9 associated with each track (Track 01, 02 and 03) for processing raw, analog data therefrom, a gated buffer module 11 receiving processed data from the A/D converter, and an F2F decoder 13 which receives processed data from the gated buffer module 11. The F2F decoder 13 processes the digital magnetic data from the A/D converter 9 into intelligent, readable magnetic data which can be fed to an output, for example via a serial TTL controller 15, for external application interpretation. The A/D converter 9 can be a module, which can comprise multiple individual A/D converters each associated with an individual magnetic track. The serial TTL controller 15 can be provided for communicating output from the F2F decoder 13 to external equipment, such as a host computer (not shown). The serial TTL controller 15 is optional, but enables communication of all magnetic track information in a serial fashion as opposed to separate lines/pins.

Also shown are an M-card 17, a PICC card 19, an external PCD 21 and PCD antenna 23 (which is shown internal to the PCD 21 but could be a separate component). As shown, the PCD 21 is an external component (associated with external equipment) which communicates digital signals from a PICC 19 to the gated buffer module 11, such as via PICC signal pin 15 and PICC disable pin 27. The gated buffer module feeds the F2F decoder 13 with M-card 17 data processed by the A/D converter 9. The F2F decoder 13 can selectively decode any one or combination of discrete multiple magnetic tracks 01-03 read by the multiple track magnetic head 7, which tracks can have different formats. The MTMD configuration 5 can thus solve the often-difficult task of matching a magnetic head selection and output stream with a single associated F2F decoder. In addition, the ability to select any combination of read head tracks provides conventionally unrealized options to auto configure the magnetic reader to accept multiple tracks with varying formats. This can be accomplished in the MTMD configuration 7 through the enabling of individual clock input selections (i.e., clock-1, clock-2 and clock-3). Alternatively, the F2F decoder could employ a strobe output for each track.

Conventional magnetic heads with multiple tracks can typically employ both an equal number of associated F2F decoders and interface logic made up of multiple components, thus requiring large undesired footprints and increased power consumption. In the MTMD configuration, a single integrated device provides a smaller footprint solving both of the aforementioned problems, thus allowing for new and compelling applications using smaller, more power efficient implementations.

The information flow, or processing of data, through the MTMD 5 can be as follows: raw/analog data from the multiple track magnetic head 7 is fed to the A/D converter 9; the external PCD 21 feeds digital control signals to the gated buffer module 11; digital output from the A/D converter 9, corresponding to the magnetic strip data, also feeds the gated buffer module 11; and the processed digital data from the magnetic tracks is routed from the gated buffer module 11 to the F2F decoder 13 and thence to an output, e.g., the Serial TTL controller 15, whereas the data from the PICC can be fed directly to the output.

The gated buffer module 11 provides the decision making logic for the device. The gated buffer module 11 defines the logic and routing that controls the communication of M-card 17 data, and PICC 19 data (and/or S-card data), to the F2F decoder 13, and Serial TTL controller 15. The gated buffer module 11 also generates signals to notify external devices, including the PCD 21, if the MTMD 5 is already processing an M-card 17, PICC 19, (and/or S-card). The gated buffer module 11 also can be interrupted by the PCD 21, if the logic is configured to enable this response. The gated buffer module 11 could terminate the magnetic operation, and/or store the magnetic data for completion at a later period so as to permit a PICC 19 take over the processing event.

The M-Card signal pin 29 provides status to the PCD 21, or externally connected circuitry (not shown), informing of the M-Card 17 becoming active, or, if the M-Card signal 29 is driven to a low state (zero), that it is already active. This is accomplished by feeding analog data from the three magnetic tracks 01, 02, 03 of the multiple track magnetic head 7 to the A/D converter 9 and communicating the output of the A/D converter 9 to the gated buffer module 11. The gated buffer module 11 temporarily stores the output of the A/D converter 9 and generates the M-Card signal 29 activity state. If an M-Card signal 29 generated by M-Card 17 activity is driven to a low-state, externally connected equipment (not shown) is informed that an active M-Card 17 processing event is occurring. In the event the PICC signal 25 is pulled to an active low state by external circuitry associated with the PCD 21 detecting PICC 19 activity, the gated buffer module 11 logic can preempt the M-Card 19 activity so that the PCD 21 activity can proceed. Alternatively, the MTMD 5, via the gated buffer module 11 logic, can be configured to not allow preemption of the M-Card 17 activity if the PICC disable 25 is driven to a low-state.

The gated buffer module 11 logic can take into account M-Card 17 activity from the magnetic head 7 (via the A/D converter 9), PICC signal pin 25 logic level, and the PICC disable pin 27 logic level to determine the M-Card 17 activity logic level. The gated buffer module 11 can be used in two different manners. In general the gated buffer module 11 functions as the input logic decision tree for input signals such as PICC signal 25 and PICC disable 27 as well as output the M-Card signal 29. In the case of the two input signals, PICC signal 25 and PICC disable 27, the gated buffer module 11 takes into account the two inputs and provides logic to either store the results of A/D converter 9 magnetic data in progress or to terminate the existing process. The functions of the gated buffer module 11, as an example of a presently preferred embodiment, can be as set out in more detail in the following table:

| MTMD Pin | State of Pin | gated buffer module Function |
| --- | --- | --- |
| PICC disable | Low or active | M-Card or magnetic activity being preempted is not permitted. The M-Card signal sent to the PCD would indicate that magnetic activity was on-going and the PCD activity would not be able to gain access of the hosting processor until the M-Card signal becomes in-active. |
| PICC disable | High or in-active | M-Card signal upon activation would be driven to an in-active state if PICC disable was in-active and PICC signal became active. (The M-Card signal would not be permitted to become active either) The gated buffer would either store all magnetic data taken in from the A/D converter before the F2F decoder was permitted to operate on it or the gated buffer would simply terminate the Magnetic process and force the M-Card signal to become in-active so that the PCD activity would take precedence and/or the in process magnetic activity would terminate and therefore need to be restarted as if a newly requested card presentation to the system was made. If the A/D magnetic data were buffered because of preemption, the data would be sent to the F2F decoder upon PICC signal becoming in-active. The gated buffer logic would keep count of the preemption activated from the PICC signal. If this occurs more than once within a given amount of time, the A/D magnetic data held in the gated buffer would be cleared as if the magnetic occurrence never happened. |
| PICC signal | In-active | The gated buffer logic simply passes all magnetic activity through and the M-Card signal becomes active upon magnetic activity. |
| PICC signal | Active | See PICC disable signal in-active |
| M-Card | In-Active | Signifies that no magnetic activity is requested or in process. This allows the systems PICC activity through the PCD to continue or start without concern of any magnetic card activity interference |
| M-Card | Active | Provides status to an external device such as a PCD to inform that magnetic activity is occurring. The PCD may accept this active state and hold off on any PICC activity until the magnetic activity is completed and the M-Card signal becomes in-active. Or the PCD may send the PICC signal anyway forcing the magnetic active to terminate or be preempted. This would force the M-Card signal to an in-active state. In preempted mode, the A/D magnetic data would be stored in the gated buffer awaiting PICC signal to become in-active before proceeding. This magnetic A/D data would only be stored for a short period of time before complete termination. The combination of the input Clock signal from one of the Track reads and PICC signal occurrences would determine this period of termination and the gated buffer being cleared. |

The A/D converter 9 is generally a separate module (comprising multiple individual A/D converters) included within the monolithic silicon substrate, i.e., part of the chip. The Serial TTL controller 15 can utilize a serial interface communications scheme of any conventional type. Standard serial interface schemes include, for example, but not be limited to, USB, RS232, and RS485. VDD denotes the positive power source input symbol associated with CMOS devices that support mixed signal (analog and digital). When mixed signal technology is implemented, it is usually necessary that two grounds be provided. One such ground is denoted by VSS (Logic Ground) and the other is denoted by Case Ground. Case Ground is normally necessary for the analog (RF) circuits, and VSS is normally necessary for the digital circuitry. CMOS technology used to generate integrated circuits references ground as VSS, or "logic ground." VSS ground is usually coupled to other circuits that would be providing input to the MTMD circuitry.

The MTMD configuration 5 can solve the often-difficult task of matching a magnetic head 7 selection and output stream with an associated discrete F2F decoder 13. In addition, the ability to select any combination of read head tracks gives the user conventionally unrealized options to auto-configure the magnetic reader to accept multiple tracks with varying formats. This can be accomplished through the enabling of the individual clock input selections, Clocks 1 through Clock 3. In the MTMD configuration 5, a single integrated device can provide for a smaller footprint solving both of the aforementioned problems, thus allowing for new and compelling applications using smaller, more power efficient implementations.

The MTMD configuration 5 can incorporate one or more of the following features: the integration of a matched multi-track magnetic head 7 with an F2F decoder 13; a selectable F2F decoder 13 enabling the activity of any combination of reads from multiple tracks; the signaling of M-card 17 activity; and the signaling of PICC 17 activity.

Figure 2:
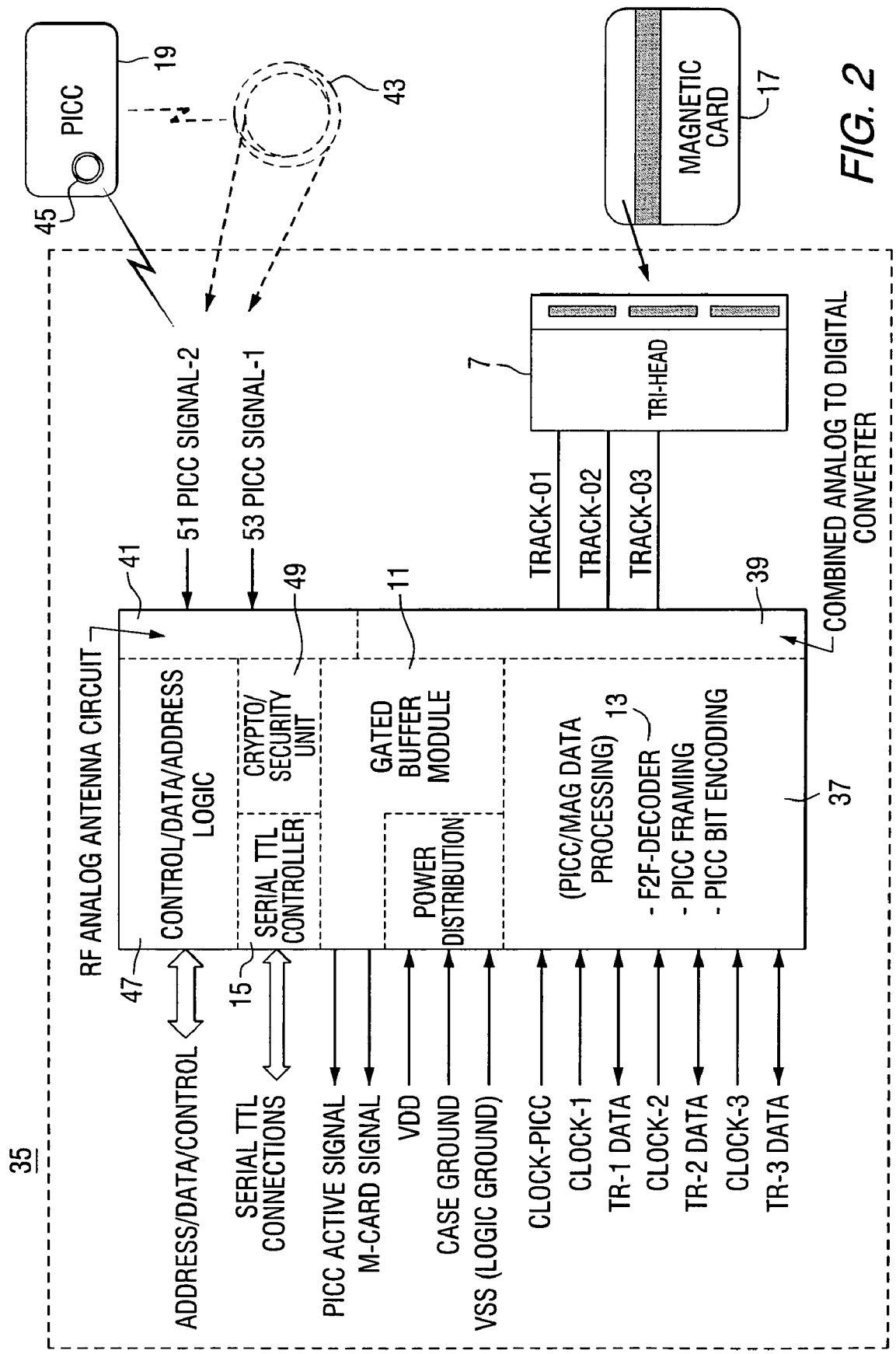
FIG. 2 illustrates an embodiment of an IMPD configuration according to the invention.

FIG. 2 illustrates a further embodiment of the invention, referred to as the IMPD configuration 35. The IMPD configuration 35 can include all of the components included in the MTMD 5, and additionally a PICC Data Processing unit 37 and combined A/D converter 39 and RF/Analog antenna circuit 41 which are integrated into, or with, the F2F decoder 13. The integrated unit, i.e., PICC Data Processing unit 37, combined A/D converter 39, and RF/Analog antenna circuit 41, can function as an internal PCD. The combined A/D converter 39 is designed to receive data from both the radio frequency modulated PICC input received via the RF analog antenna circuit, once a PICC becomes active in the field, and the analog signals from the multiple track magnetic head 7, when active data is received from the swiping of a M-Card 17. Like the A/D converter 9 in the MTMD 5, the combined A/D converter 39 can be a module comprised of multiple individual A/D converters each associated with a separate magnetic track. Similarly, a separate A/D converter can be associated with the RF antenna circuit 24.

The RF analog antenna circuit 41 is shown integral with the IMPD 35. Alternatively, an external antenna 43 could be connected to the IMPD 35, making the internal RF antenna 41 unnecessary. In any case, only one antenna, either internal 41 or external 43, is needed. The PICC 19 contains its own integral antenna 45. An integrated antenna 41 would most likely be smaller in area and/or diameter, but would likely reduce the read/write range of the PICC 19. Thus, a larger external antenna 43 may be desired in some configurations. However, an integrated antenna 41 that matches the RF antenna circuit could also make the per area used of the antenna more efficient. An ON/OFF control for the PCD excitation can also be provided, for example, where a low power battery operated embodiment of the invention may be desired.

The combined A/D converter 39 can process both raw magnetic data from the each track (Track 01 through Track 03) and raw RF data from the RF analog antenna circuit 41. The combined A/D converter 39 sends the converted analog to digital signal to the DSP processor circuitry, i.e., the PICC data processor 37, which provides the PCD functionality. As with the raw data from the magnetic head 7, the PICC 19 data is also initially presented in a raw (analog) manner, appearing as a sign wave containing information. The raw/analog data from the PICC 19 is received and modulated, or de-modulated, by the RF circuit 41. This analog data must then be converted to a digital format for efficient processing by the PICC data processor 37. The A/D converter 39 converts the analog data from the RF antenna circuit 41 to a digital representation so that a DSP, such as constituted by the PICC data processor 37, can quickly act upon the information and proceed.

The flow, or processing of information in the IMPD 35 is slightly different than for the MTMD 5, owing to the fact that the IMPD 35 incorporates an internal PCD and RF antenna circuit 41. In the IMPD 35, both raw/analog data from the multiple track magnetic head 7 and raw/analog data from the internal RF antenna circuit 41 are fed to the A/D converter 39. The A/D converter 39 converts all of the analog data to digital form. This is in contrast to the MTMD 5, in which there are no analog signals corresponding to PICC 19 data. In the MTMD 5, digital signals corresponding to PICC 19 data are fed to the gated buffer module 11, such as via PICC signal 25 and PICC disable 27 pins, directly from the external PCD 23. However, in the IMPD configuration 35, raw PCD analog signals are created by the internal RF antenna circuit 41. These analog signals are then processed by the combined A/D converter 39 and subsequently fed to the gated buffer module 11, through which all of the digital data can be routed to the F2F decoder 13, and/or to a control signal output, i.e., the Serial TTL controller 15.

As described above in regard to the MTMD 5, the gated buffer module 11 feeds only digitized magnetic track data to the F2F decoder 13. The gated buffer module 11 contains logic and routing that determines whether the magnetic and PCD data should be passed on, such as to the F2F decoder 13 (which is integrated in the PICC data processor module 37 in the IMPD configuration 35 shown) and or the Serial TTL controller 15. The gated buffer module 11 also creates the signals which notify external devices, such as a system host processor of external equipment (see FIG. 4) that the IMPD 35 is already processing a M-card 17 or PICC 19.

As in the MTMD 5, the function of the F2F decoder 13, though now integrated into the PICC data processor 37, can still be to process the digital magnetic data into intelligent readable magnetic data and feed such data to the output serial TTL controller 15, or a control/data/address bus connection 47, for external application interpretation. A crypto/security module 49 can be provide to take the data being sent to and from the serial TTL controller 15, or control/data/address bus 47, and provide encryption and decryption of the data. Encryption can be performed on all outgoing data from the PICC data processor unit 37, whereas decryption can be performed on all data coming into the serial TTL controller 15, or control/data/address bus 47, before it is communicated to the PICC data processor 37. Alternatively, the PICC data processor could also be employed to perform the encryption/decryption operation, since this is typically performed by a software algorithm for 3DES/DES (Data Encryption Standard or AES (Advanced Encryption Standard.)

The PICC signal-1 51, PICC signal-2 53, internal PICC Active signal and internal M-Card signal are all used by the gated buffer module 11 to determine the state of the M-Card signal pin. The M-card signal logic is used internally, as well as driven externally, to signify activity from the multiple track magnetic head 7 when driven to a low-state logic level. The PICC Active signal is also used internally, and driven externally, to signify activity from the PICC 19 is occurring. The external use of the M-Card signal is set out previously, in the table describing the functioning of the gated buffer module 11 in this regard. As for internal use, the M-Card signal is monitored by the gated buffer module to determine the on-going state of the signal. Basically, the M-Card signal can be part of the logic used in combination with the PICC signal and PICC disable signal, to determine if, and/or when, preemption and termination of the M-card signal should occur. If the M-Card signal is active, then a decision will be made by the gated buffer module 11 logic to preempt and store the remaining magnetic data, terminate processing the magnetic data, or continue processing the magnetic data.

The PICC active signal can be driven to a low state level to signify activity. The PICC active signal may be used by external system logic to signify that the IMPD 35 is presently busy processing a PICC 19. The M-card signal and PICC active signal will not be in a low-state at the same time as determined by the gated buffer module 11. The M-card signal would be driven to a low-state while the PICC active signal is driven to a high-state by the gated buffer module 11 logic. In this state of selection, the logic controlling the combined A/D converter 39 and RF analog antenna circuit 41 signifies that only the multiple track magnetic head 7 data can be processed. The M-card signal will not be preempted, in this particular IMPD configuration 15, thus the multiple track magnetic head operation will not be stopped. It is not necessary to preempt the M-card signal since the IMPD 35 can quickly process both the PICC 19 and M-card 17 data in a fast and orderly manner. The PICC active signal would be driven to a low-state while the M-card signal is driven to a high-state by the gated buffer module logic. In this state of selection the logic controlling the combined A/D converter 39 and RF antenna circuit 41 signifies that only the PICC 19 data can be processed. The PICC active signal will also not be preempted in this particular IMPD configuration 35, thus the PICC 19 operation will not be stopped either. It is also not necessary to preempt the PICC active signal, since the IMPD 35 can quickly process both the PICC 19 and M-card 17 data in a fast and orderly manner. Once the M-card signal is acknowledged, the combined A/D converter 39 and RF analog antenna circuit 41 can proceed by passing the appropriate digital data stream from either the PICC 19 or M-card 17 to the gated buffer module 11. The M-cad signal, or a derivation of the M-card signal can be used to select the appropriate digital data output. The selected output data is sent to the PICC data processor 37 for the appropriate processing. In the case of PICC 19 data, the data processor would invoke PICC framing and bit encoding along with other necessary PICC 19 processing. The PICC data processing can be accomplished through the use of a DSP. If M-card data were present, the gated buffer module 11 would invoke the F2F decoder 13 function of the PICC data processor 37. The PICC data processor 37 output, upon completion of processing the PICC 19 digitally converted data, can be sent to the crypto/security unit 49. The crypto/security unit 49 may use either a DES or an AES standard crypto algorithm to encrypt the data. Once the data is encrypted, it is sent to the control/data/address logic module 47, for output, or can be output via the serial TTL controller 15 to external equipment (refer to FIG. 3).

If the PICC data processor 37 has completed an M-card F2F decoder 13 process, the PICC data processor 37 would send the resulting data stream directly to the serial TTL controller 15, for output to external equipment, such as a host processor.

In the IMPD configuration 35, event activity can be detected on both PICC 19 and M-card 17 interfaces. When dual activity is detected, the gated buffer module 11 can resolve the contention by preempting either the M-card 17 activity or the PICC 19 activity. The presumption could be based upon which process started first. Since all of the logic can be integrated into a single device, the possibility of two electronic media types attempting to process at the same time, thereby creating contention, is virtually eliminated. This can be accomplished by designing the gated buffer module 11 logic in a manner such that a new processing task will not be enabled until a previously initiated task is completed. In addition, the M-card signal provides an external control status that signifies an M-card busy signal, or if the M-card busy signal is not active, that a PICC 19 process is active, or that there is no activity occurring.

A provision to preempt the M-card 17 activity when PICC 19 activity becomes present can be managed early in the media transaction cycle, allowing for one media to take precedence over another. The potential occurrence of multiple media read contention is further reduced, thus simplifying, or solving, the need for separate logic to resolve multi-electronic media activity and data processing order within a system application. No known conventional device provides this feature.

The IMPD configuration 35 can incorporate one or more of at least the following features: a PICC data processor 37 functioning as digital signal processor (DSP) and can include an integrated F2F decoder 13 enabling the activity of any combination of reads from multiple magnetic tracks in combination with PCD processing of data framing and bit encoding; the signaling of M-card 17 activity; the signaling of PICC 19 activity; the integration of the PCD control/data/address logic module 47; an integrated, combined A/D converter 39 for analog data from an M-card 17 and a PICC 19; a matched multiple track magnetic head 7; an integrated RF antenna circuit 41; a two-way multiplexer (via the gated buffer module 11) to determine order of M-card 17 or PICC 19 processing activity; and an integrated crypto/security unit 49.

Figure 3:
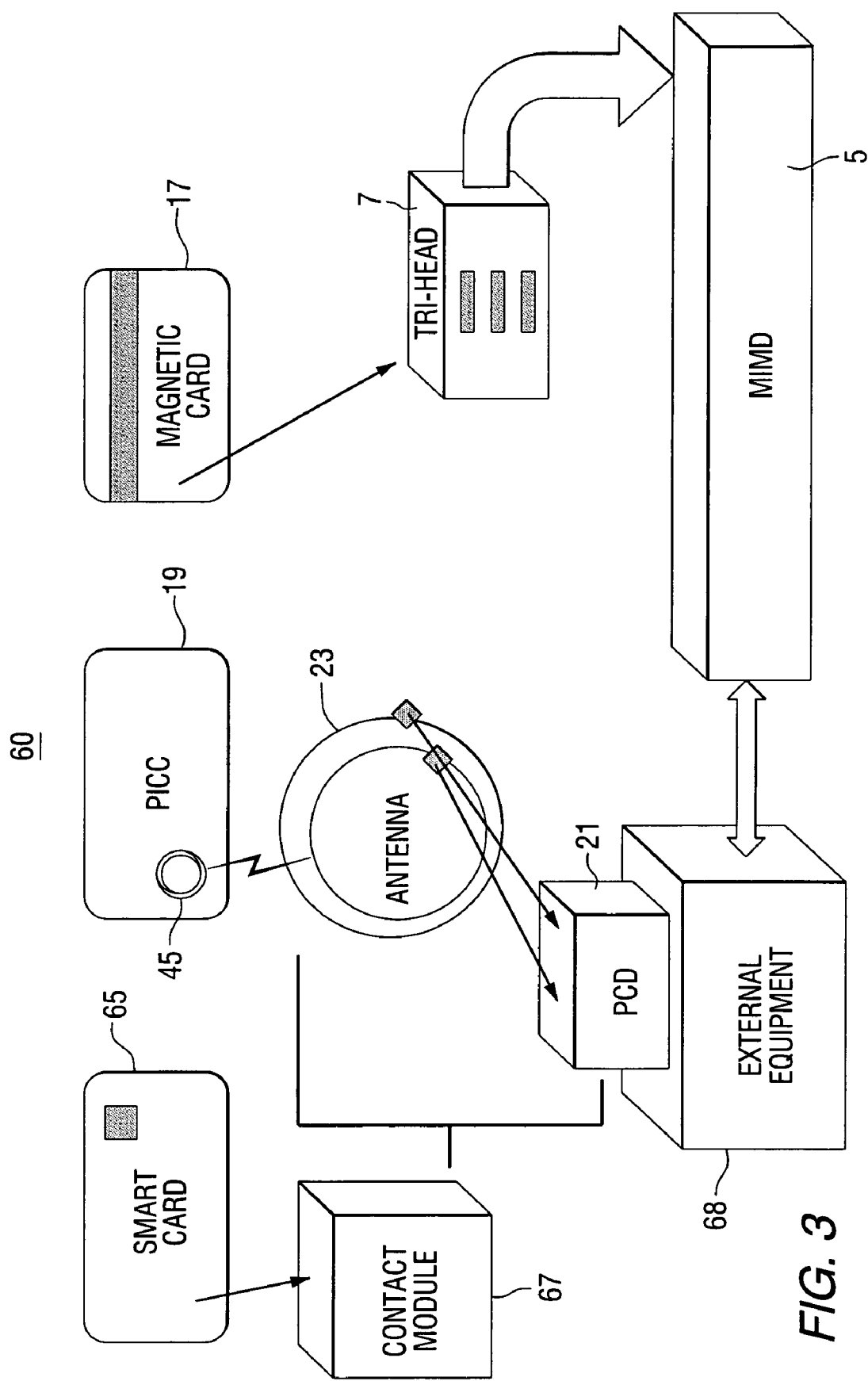
FIG. 3 illustrates an embodiment of a system implementation of an MTMD.

Referring now to FIG. 3, an embodiment of a system implementation 60 for the MTMD 5 is shown. One significant feature of the MTMD configuration 5 is the matching of the multiple track magnetic head 7 with the selectable F2F decoder 11. This matched pair permits the analog magnetic signals to be interpreted, via the A/D converter 9, in a manner that ensures high quality signaling from the magnetic strip card to the F2F decoder's 11 digital outputs. Data from magnetic tracks TR-1, TR-2, and TR-3 is the translated magnetic strip data from magnetic tracks Track 01, Track 02, and Track 03, which has been converted into a TTL or other digital output signal level. Input clock signals 01, 02, and 03 can serve multiple functions by acting as the track data selector and as the track data information synchronizer. The M-card 17 output signal 29 is an early warning magnetic card active present signal. This signal is processed in conjunction with the PICC signal 25 input indicating that a PICC 19 event is active in the external connected system. Output from the MTMD 35 is provided to external equipment 68, with which the external PCD 21 and PCD antenna 23 may also be associated.

In the event that one of the status pins such as the PICC active signal 25 becomes activated, such as by a hosting processor element of the external equipment managing an external PCD function, the PICC 25 signal is used to alert the F2F decoder 11 logic that a PICC 19 is requesting processing activity. In the event that M-card 17 signal is already active due to a M-card 17 being present, the hosting processor would refuse the PICC 19 transaction activity until the M-card 29 signal was cleared or placed in a logic high state. The PICC signal 25 can be used to queue the F2F decoder 11 logic of a pending PICC 19 transaction. The inverse is true of the PICC signal 25 with respect to M-card signal 29. The PICC disable 24 pin will disable the PICC 19 signal from preempting a M-card 17 activity.

As further shown in FIG. 3, optionally, an S-card 65 can communicate with a contact module 57 that can be provided in addition to the external PCD 21 and PCD 23 antenna. To read or write an S-card 65, information would be transferred between the S-card 65 and the gated buffer module 11 by the contact module 67 similarly to the external PCD 23 in regard to the PICC 19.

Figure 4:
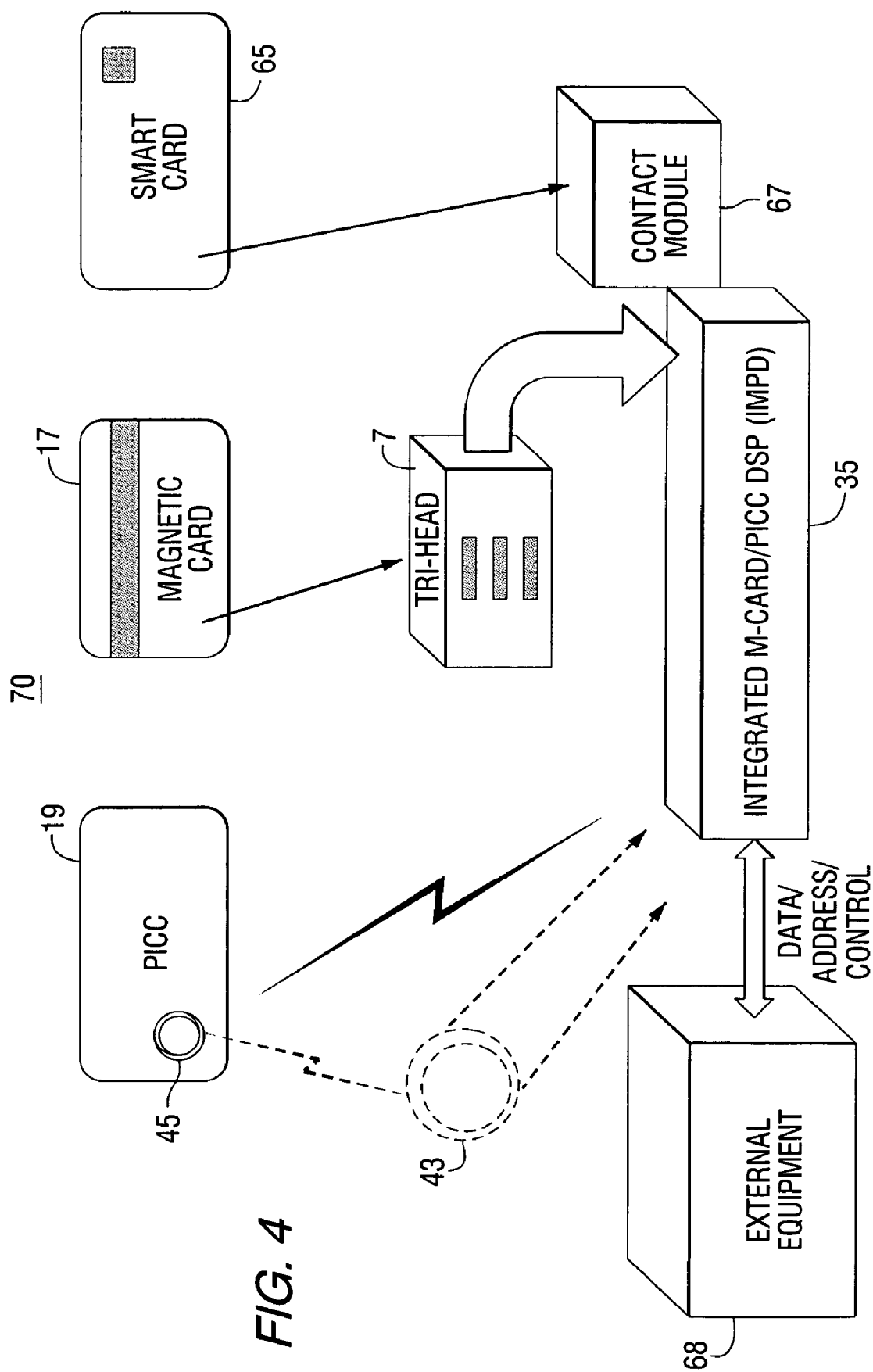
FIG. 4 illustrates an embodiment of a system implementation of an IMPD.

Referring now to FIG. 4, there is depicted an embodiment of a system implementation 70 for the IMPD configuration 35, in which the integration of M-card 17 front-end data processing in conjunction with PICC data processing (reader/writer data processing) is accomplished, via the PICC data processor 37. In this implementation, the MTMD 5 functions (refer to FIGS. 1 and 3) become part of the IMPD configuration 35. Additionally, the IMPD 35 achieves a higher order of integration efficiency by bringing together the combined A/D converter 39 and PICC data processor, which can include an integrated F2F decoder 13, and also which constitutes a common digital signal processor (DSP) that performs both the PICC 19 and M-card data processing functions. In the case of PICC 19 functions, the DSP achieves many of the functions necessary in implementing a PCD. In order to implement other PCD required functions, the IMPD 35 includes the other integrated modules, as shown and described in connection with FIG. 2, including the crypto/security unit 49 and the gated buffer module 11, which is the logical gatekeeper to assure that the right data is processed and that the proper control pins are asserted. The control/data/address module 49 can provide a primary external interface to external equipment 68. This high level of integration include the additional physical integration of the internal RF antenna circuit 41 and multiple track magnetic head 7 into a single module, obviating the need for the external PCD antenna 43. Alternatively, the internal RF antenna circuit 41 could be a connective module The external equipment 68 can be representative of, for example, a host computer, with which the IMPD 35 output can be shared.

In the IMPD configuration 35, the PCD functions can be performed by the PICC data processor 37, with which is integrated the F2F decoder 13, and internal RF antenna circuit 41. The matched RF antenna circuit 41 communicates data between the PICC 19 and the combined A/D converter 39. The M-card 17 data processing is also supported through the PICC data processor 37 and combined A/D converter. The PICC data processor 37 can process all signals originating from either the M-card 17 and the PICC 190, and/or S-card 65. The combined A/D converter 37 processes analog data from both the RF antenna circuit 41 and the magnetic tracks, and feeds the converted data to the gated buffer module 11. The gated buffer module 11 processes the data and feeds the data to the PICC data processor 37, including the integrated F2F decoder 14.

As described previously (refer to FIG. 3), the IMPD 35 could also include the contact module 67, e.g., an S-card 65 reader/writer unit, if it is desired to be able to read/write a contact type S-card 65. In the MTMD 5 configuration, the contact module 67 could be associated with the external equipment 68. However, in the IMPD configuration 35, the contact module 65 could be integrated, such as including the contact module 65 input to the Serial TTL controller 15. The data will be processed by the PICC data processor 37 via the gated buffer module 11. For example, for an S-card 65, the data processing functions for bit processing would not be needed, and the DSP, i.e., PICC data processor 37 would simply prepare the data stream for output to the Serial/TTL output 15.

According to the foregoing description, various configurations of the MTMD and IMPD embodiments can include at least the following:

A multiple track magnetic read head integrated with a F2F decoder outputting digital level logic signals.

A monolithic semiconductor device containing analog magnetic heads, decoder logic, and serial data processor.

A selectable F2F decoder output allowing for any combination of magnetic data streams.

With a PICC being present, output digital signal providing advanced PICC data processing activity status or alert signaling and activity in progress to other circuitry or hosting processor if a magnetic card attempts to gain access.

With a magnetic card being present, output digital signal providing advanced card present alert signaling and activity to other circuitry or hosting processor if S-card/PICC or other reader attempts to gain access by an integrated DSP/PICC data processor, combined A/D converter, and gated buffer module.

A combined A/D converter that accepts analog signals from a magnetic head, or multiple track head, and analog data from a PCD modulated RF antenna circuit.

Integrated F2F decoder with integrated serial interface.

Matched PCD antenna to RF analog antenna interface circuit in combination with a magnetic head and DSP/PICC data processor.

Matched PCD antenna to RF analog antenna interface circuit in combination with a magnetic head and DSP/PICC data processor and cypto/security unit.

Integrated monolithic DSP/PICC data processor for PCD and magnetic head combined functions, such as bit-encoding, bit-framing, and F2F decoding.

PICC/S-card activity queuing circuitry that allows for a pending PICC/S-card request while a magnetic decoding function is taking place.

Although certain embodiments of the invention have been described in detail, it will be appreciated by those skilled in the art that various modifications to those details could be developed in light of the overall teaching of the disclosure. Accordingly, the particular embodiments disclosed herein are intended to be illustrative only and not limiting to the scope of the invention.

What is claimed is:

1. A card reader/writer device comprising:
  a. a magnetic head having at least one track;
  b. an A/D converter receiving input from at least said at least one track;
  c. a gated buffer module accepting input corresponding to data from both a magnetic card and at least one of a PICC and a smart card, said input receivable from at least one of said A/D converter and a PCD; and
  d. an F2F decoder receiving input from said gated buffer module, said input corresponding to data from said magnetic card.

2. The device of claim 1 further comprising said gated buffer module detecting magnetic card activity and at least one of PICC and smart card activity, and said gated buffer module managing contention therebetween.

3. The device of claim 2 further comprising said gated buffer module managing said contention therebetween by preempting one of said magnetic card activity and said at least one of said PICC and smart card activity, and permitting the other activity to continue.

4. The device of claim 1 wherein said PCD further comprises an external PCD communicable with said gated buffer module.

5. The device of claim 1 further comprising;
  a. a PICC data processor receiving input from said gated buffer module;
  b. an internal RF analog antenna circuit receiving input from said PICC, said PICC data processor and said RF analog antenna circuit functioning as an internal PCD and PCD antenna;
  c. said A/D converter also receiving input from said internal RF antenna; and
  d. said gated buffer module receiving input from said A/D converter, said input from said A/C converter corresponding to data from both said at least one track and said PICC.

6. The device of claim 5 further comprising said F2F decoder integrated with said PICC data processor.

7. The device of claim 1 further comprising;
  a. a PICC data processor receiving input from said gated buffer module, said PICC data processor functioning as an internal PCD;
  b. an external RF antenna for communicating data from said PICC to said A/D converter; and
  c. said gated buffer module receiving input from said A/D converter, said input from said A/D converter corresponding to data from both said at least one track and said PICC.

8. The device of claim 7 further comprising said F2F decoder integrated with said PICC data processor.

9. The device of claim 1 further comprising one of an integral contact module and an external contact module connectable to said A/D converter, said contact module communicating data between a smart card and said A/D converter.

10. The device of claim 1 further comprising a serial interface controller.

11. The device of claim 1 further comprising a crypto/security unit.

12. The device of claim 1 further comprising:
  a. said magnetic head having a plurality of tracks;
  b. said A/D converter receiving input from each of said plurality of tracks;
  c. said gated buffer module receiving input from said A/D converter; and
  d. said F2F decoder receiving input from said gated buffer module, said F2F decoder selectable to decode each of said plurality of tracks.

13. A multi-track magnetic head device comprising:
  a. a magnetic head having a plurality of tracks;
  b. an A/D converter receiving input from each of said plurality of tracks;
  c. a gated buffer module receiving input from said A/D converter; and
  d. an F2F decoder receiving input from said gated buffer module, said F2F decoder selectively decoding each of said plurality of tracks.

14. The device of claim 13 further comprising at least one of said A/D converter and said gated buffer module receiving input from at least one of a PICC and a smart card.

15. The device of claim 14 further comprising said gated buffer module detecting magnetic card activity and activity of at least one of said PICC and said smart card, and said gated buffer module managing contention therebetween.

16. The device of claim 15 further comprising said gated buffer module managing said contention therebetween by preempting one of said magnetic card activity and said activity of at least one of said PICC and said smart card and permitting the other activity to continue.

17. The device of claim 14 further comprising said gated buffer module receiving said input from said PICC via an external PCD communicable with said gated buffer module.

18. The device of claim 14 further comprising:
  a. an internal RF analog antenna circuit;
  b. a PICC data processor, said internal RF analog antenna circuit and said PICC data processor functioning as an internal PCD;
  c. said A/D converter receiving input from said internal RF analog antenna circuit, said input including input from said PICC; and
  d. said gated buffer module receiving input from said A/D converter, said input including input from both said plurality of magnetic tracks and said PICC, said gated buffer module communicating with said PICC data processor.

19. The device of claim 18 further comprising said F2F decoder integrated with said PICC data processor.

20. The device of claim 14 further comprising:
  a. a PICC data processor functioning as an internal PCD;
  b. an external RF antenna;
  c. said A/D converter receiving input from said external RF antenna, said input including input from said PICC; and
  d. said gated buffer module receiving input from said A/D converter, said input corresponding to input from both said plurality of magnetic tracks and said PICC.

21. The device of claim 20 further comprising said F2F decoder integrated with said PICC data processor.

22. The device of claim 14 further comprising one of an internal contact module and an external contact module connectable to said A/D converter, said contact module communicating data between a smart card and said A/D converter.

23. The device of claim 13 further comprising a serial interface controller.

24. The device of claim 13 further comprising a crypto/security unit.

25. A method for multiple card input acceptance comprising:
  a. accepting input from at least one magnetic track and at least one of a PICC and a smart card;
  b. processing said input from each of said at least one magnetic track and said at least one of said PICC and said smart card; and
  c. selectively decoding said input from each of said at least one magnetic track; and
  d. combining A/D conversion of analog data from a magnetic track and analog data from an analog RF antenna circuit communicating with a PICC.

26. The method of claim 25 further comprising managing contention between input from said at least one magnetic track and input from said at least one of said PICC and said smart card.

27. The method of claim 26, wherein said managing contention further comprises preempting one of said input from said magnetic track and said input from said at least one of said PICC and said smart card.

28. The method of claim 25 further comprising decrypting said input from each of said at least one magnetic track and said at least one of said PICC and said smart card.

29. The method of claim 25 wherein:
  a. said at least one magnetic track further comprises a plurality of magnetic tracks; and
  b. selectively decoding input from each of said plurality of magnetic tracks.

30. The method of claim 29 further comprising integrating a multiple track magnetic head with an F2F decoder.

31. The method of claim 30 further comprising integrating an F2F decoder with a PICC data processor, said PICC data processor performing proximity coupling and digital signal processing associated with said PICC.

32. The method of claim 31 further comprising associating an RF analog antenna circuit with said PICC data processor.

33. A card reader/writer device comprising:
  a. a magnetic head having at least one track for receiving input from a magnetic card;
  b. an internal RF analog antenna circuit for receiving input from a PICC;
  c. an A/D converter receiving input from at least said at least one track and said internal RF analog antenna circuit;
  d. a gated buffer module receiving input from said A/D converter, said input corresponding to data from both said magnetic card and said PICC;
  e. a PICC data processor receiving input from said gated buffer module, said PICC data processor and said RF analog antenna circuit functioning as an internal PCD and PCD antenna; and
  f. an F2F decoder receiving input from said gated buffer module, said input corresponding to data from said magnetic card.

34. The device of claim 33 further comprising said gated buffer module detecting magnetic card activity and at least one of PICC and smart card activity, and said gated buffer module managing contention therebetween.

35. The device of claim 34 further comprising said gated buffer module managing said contention therebetween by preempting one of said magnetic card activity and said at least one of said PICC and smart card activity and permitting the other activity to continue.

36. The device of claim 33 further comprising said F2F decoder integrated with said PICC data processor.

37. The device of claim 33 further comprising one of an integral contact module and an external contact module connectable to said A/D converter, said contact module communicating data between a smart card and said A/D converter.

38. The device of claim 33 further comprising a serial interface controller.

39. The device of claim 33 further comprising a crypto/security unit.

40. The device of claim 33 further comprising:
 a. said magnetic head having a plurality of tracks;
 b. said A/D converter receiving input from each of said plurality of tracks;
 c. said gated buffer module receiving input from said A/D converter; and
 d. said F2F decoder receiving input from said gated buffer module, said F2F decoder selectable to decode each of said plurality of tracks.

* * * * *